(12) United States Patent
Wu

(10) Patent No.: US 8,331,322 B2
(45) Date of Patent: Dec. 11, 2012

(54) METHOD OF HANDLING RADIO BEARER RESUMPTION, WIRELESS COMMUNICATION DEVICE AND WIRELESS COMMUNICATION SYSTEM THEREOF

(75) Inventor: Chih-Hsiang Wu, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 355 days.

(21) Appl. No.: 12/607,980

(22) Filed: Oct. 28, 2009

(65) Prior Publication Data

US 2010/0184438 A1 Jul. 22, 2010

Related U.S. Application Data

(60) Provisional application No. 61/146,640, filed on Jan. 22, 2009.

(51) Int. Cl.
H04L 12/26 (2006.01)
(52) U.S. Cl. ......................................... 370/331; 455/436
(58) Field of Classification Search .......... 370/328–338; 455/436–444
See application file for complete search history.

(56) References Cited

U.S. PATENT DOCUMENTS

2010/0029280 A1* 2/2010 Tenny et al. ................... 455/436

OTHER PUBLICATIONS

"A. RRC connection reconfiguration procedure for handover within E-UTRA," 3GPP TS 36.331 V8.4.0., clause 5.3.5.4, 5.3.5.5, 5.3.7, Year: 2009.

* cited by examiner

Primary Examiner — Pao Sinkantarakorn
(74) Attorney, Agent, or Firm — Birch, Stewart, Kolasch & Birch, LLP

(57) ABSTRACT

A method of handling radio bearer resumption is illustrated in an exemplary embodiment of the present invention to prevent the transmission stall and the reception on the suspended signaling radio bearer and the suspended data radio bearers. First the wireless communication device receives the connection reconfiguration message including the handover message. Second the wireless communication device determines whether the received connection reconfiguration message including the handover message is the first received connection reconfiguration message including the handover message after a successful completion of a connection re-establishment procedure. Third, the wireless communication device resumes at least one of the suspended signaling radio bearer and the suspended data radio bearers when the received connection reconfiguration message including the handover message is the first received connection reconfiguration message including the handover message after the successful completion of the connection re-establishment procedure.

8 Claims, 7 Drawing Sheets

METHOD OF HANDLING RADIO BEARER RESUMPTION, WIRELESS COMMUNICATION DEVICE AND WIRELESS COMMUNICATION SYSTEM THEREOF

CROSS-REFERENCE TO RELATED APPLICATION

This application claims the priority benefit of U.S.A. provisional application Ser. No. 61/146,640, filed on Jan. 22, 2009. The entirety of the above-mentioned patent application is hereby incorporated by reference herein and made a part of specification.

BACKGROUND OF THE INVENTION

1. Field of Invention

The present invention generally relates to a method utilized in a wireless communication system and in a wireless communication device thereof, and more particularly to a method of handling the radio bearer resumption for the third Generation Partnership Project (3GPP) standard, a wireless communication device and a wireless communication system thereof.

2. Description of Prior Art

With the development of wireless communication systems, people can talk and transmit data via the wireless channel by using the wireless communication devices. Now, the 3GPP standard is evolving, and there are still some problems not solved.

Before the wireless communication device and the network backbone exchange the user data with each other, a control connection of the wireless communication device and the network backbone must be established. In the 3GPP standard, the control connection is the Radio Resource Control (RRC) connection, the wireless communication device is the User Equipment (UE), and the network backbone is the Universal Terrestrial Radio Access Network (UTRAN) used in the Wideband Code Division Multiple Access (WCDMA) system, or the Evolved Universal Terrestrial Radio Access Network (E-UTRAN) used in the Long-Term Evolution (LTE) system.

Please see FIG. 1, FIG. 1 is a flow chart showing the RRC connection procedure of the wireless communication device and the network backbone. In the example, the wireless communication device is the UE, and the network backbone is E-UTRAN. In step S100, the UE sends the RRCConnectionRequest message. In step S102, after the E-UTRAN receives the RRCConnectionRequest message from a wireless channel, it sends the RRCConnectionSetup message or the RRCConnectionReject message. If the E-UTRAN rejects to establish the RRC connection, it sends the RRCConnectionReject message; otherwise, it sends the RRCConnectionSetup message. In step S104, the UE determines whether the RRCConnectionSetup message or the RRCConnectionReject message is received. If the RRCConnectionSetup message is received, step S106 is executed; if the RRCConnectionReject message is received, the RRC connection procedure is terminated. In step S106, the UE establishes the Signaling Radio Bearer 1 (SRB1). Then in step S108, after the UE receives the RRCConnectionSetup message, the UE sends the RRCConnectionSetupCommplete message. Accordingly, after the RRC connection procedure is done successfully, the SRB1 is established.

In the 3GPP standard, SRBs are defined as RBs which are used only for the transmission of RRC and Non-Access-Stratum (NAS) messages. More specifically, the following three SRBs are defined. The SRB0 is for RRC messages using the Common Control Channel (CCCH), which is one of the logical channels. The SRB1 is for RRC messages (which may include a piggybacked NAS message) as well as for NAS messages prior to the establishment of the SRB2, all using the Dedicated Control Channel (DCCH), which is another one of the logical channels. The SRB2 is for the NAS messages, using the DCCH, and the SRB2 has a lower-priority than the SRB1 and is always configured by the E-UTRAN after security activation. The other RBs are user Data Radio Bearers (DRBs) which are used for transmitting the user data.

However, the RRC connection sometimes must be reconfigured. With regard to the purpose for handover with the Universal Terrestrial Radio Access (E-UTRA), the RRC connection reconfiguration is required. The UE can measure the signal quality of the received signal thereof, and sends a measurement report to the E-UTRAN. The E-UTRAN receives the measurement report and determines whether the UE should handover according to the calculation of the measurement report. When the E-UTRAN determines the UE should handover within E-UTRA, the RRC connection reconfiguration procedure shall start.

The RRC connection reconfiguration procedure is controlled by the E-UTRAN, and may occur when the wireless communication device should handover. However, the RRC connection reconfiguration procedure is not limited in the handover case, and sometimes it may occur in the non-handover case. If the RRC connection reconfiguration procedure occurs in the handover case, the RRCConnectionReconfiguration message must include the mobilityControlInformation message, or the UE can not know it should handover.

Please see FIG. 2, FIG. 2 is a flow chart showing the RRC connection reconfiguration procedure of the wireless communication device and the network backbone when the wireless communication device should handover. In the example, the wireless communication device is the UE, and the network backbone is E-UTRAN. In step S200, the E-UTRAN sends the RRCConnectionReconfiguration message including the mobilityControlInformation message to the wireless channel. In step S202, the UE receives the RRCConnectionReconfiguration message including the mobilityControlInformation message from the wireless channel, and determines whether it is able to comply with the configuration included in the RRCConnectionReconfiguration message including the mobilityControlInformation message. If some parameter in the RRCConnectionReconfiguration message including the mobilityControlInformation message is invalid for the UE, the UE can not comply with the configuration included in the RRCConnectionReconfiguration message including the mobilityControlInformation message, and then step S216 is executed; otherwise, the UE can comply with the configuration included in the RRCConnectionReconfiguration message including the mobilityControlInformation message, and step S204 is executed.

In step S204, the UE switches to one target cell to achieve handover. If the eutra-CarrierFreq parameter is included in the mobilityControlInformation message, the UE considers the target cell to be one on the frequency indicated by the eutra-CarrierFreq with a physical cell identity indicated by the targetCellIdentity included in the mobilityControlInformation message; otherwise, the UE considers the target cell to be one on the current frequency with a physical cell identity indicated by the targetCellIdentity parameter included in the mobilityControlInformation message. In step S206, the UE re-establishes the Packet Data Convergence Protocol (PDCP)

for all RBs that are established. In step S208, the UE re-establishes the Radio Link Control (RLC) for all RBs that are established.

It is noted that actions of steps S202-S208 upon the reception of the RRCConnectionReconfiguration message including the mobilityControlInformation message are part actions upon the reception of the RRCConnectionReconfiguration message including the mobilityControlInformation message. The other actions upon the reception of the RRCConnection-Reconfiguration message including the mobilityControlInformation message, such as timer control, value setting, and so on, are specified in the 3GPP standard.

After the RRC connection reconfiguration of the UE is done, the UE sends the RRCConnectionReconfiguration-Complete message to the wireless channel in step S210. Then the E-UTRAN receives the RRCConnectionReconfigurationComplete message from the wireless channel, and the RRC connection reconfiguration procedure is completed.

When the UE can not comply with the configuration included in the RRCConnectionReconfiguration message including the mobilityControlInformation message, the UE regards the reconfiguration procedure as failure, uses the configuration used prior to the reception of the RRCConnectionReconfiguration message, and then executes step S216. In step S216, the UE determines whether security has not been activated. If the security has not been activated, the UE performs the actions upon leaving RRC_CONNECTED with release cause 'other' in step S220; otherwise, the UE initiates the RRC connection re-establishment procedure in step S218. The details of step S220 and the security are specified in the 3GPP standard, and are not described herein again. The RRC connection re-establishment procedure is illustrated in the following description accompanied with FIG. 3.

In the RRC connection re-establishment procedure, the E-UTRAN shall reconfigure SRB1 and resume data (i.e. the RRCConnectionReestablishmentComplete message) transfer for this RB. Furthermore, the E-UTRAN shall re-activate the Access-Stratum (AS) security without changing algorithms. The RRC connection re-establishment procedure is initiated when one of the following conditions is met. One condition is that the radio link failure has been detected. The other conditions are the occurrences of the handover failure, the mobility from E-UTRA failure, the integrity check failure indication from lower layers, and the RRC connection reconfiguration failure. The occurrence of the handover failure means failing to handover within the intra-system, and the occurrence of the handover failure means failing to handover within the inter-system. The occurrence of the integrity check failure indication from lower layers means the calculated integrity being not same as the original or the default one.

Please see FIG. 3, FIG. 3 is a flow chart showing the RRC connection re-establishment procedure of the wireless communication device and the network backbone. In the example, the wireless communication device is the UE, and the network backbone is E-UTRAN. When the RRC connection re-establishment procedure is initiated, the UE suspends all RBs except the SRB0 in step S300. The SRB0 is used to transmit the RRCConnectionReestablishmentRequest message, and should not be suspended. In step S302, the UE performs cell selection in accordance with the cell selection process specified in the 3GPP standard. After the initiation of the RRC connection re-establishment procedure is done, the UE sends the RRCConnectionReestablishmentRequest message to a wireless channel by using the SRB0.

It is noted that actions of steps S300-304 upon the initiation of the RRC connection re-establishment procedure are part actions upon the initiation of the RRC connection re-establishment procedure. The other actions upon the initiation of the RRC connection re-establishment procedure, such as timer control, value setting, and so on, are specified in the 3GPP standard.

After the E-UTRAN receives the RRCConnectionReestablishmentRequest message from the wireless channel, it sends the RRCConnectionReestablishment message or the RRCConnectionReestablishmentReject message. If the E-UTRAN rejects to re-establish the RRC connection, it sends the RRCConnectionReestablishmentReject message; otherwise, it sends the RRCConnectionReestablishment message. In step S308, the UE determines whether the RRCConnectionReestablishment message or the RRCConnectionReestablishmentReject message is received. If the RRCConnectionReestablishment message is received, step S310 is executed; if the RRCConnectionReestablishmentReject message is received, step S318 is executed. When the RRCConnectionReestablishmentReject message is received, the UE performs the actions upon the actions upon moving from the RRC_CONNECTED state to the RRC_IDLE state, which are described in the 3GPP standard.

When the RRCConnectionReestablishment message is received, the UE re-establishes the PDCP for the SRB1 in step S310. In step S312, the UE re-establishes the RLC for the SRB1 in step S312. In step S314, the UE resumes the SRB1 after configuring it in accordance with the received radioResourceConfiguration information element included in the received RRCConnectionReestablishment message thereof. In step S316, the UE sends the RRCConnectionReestablishmentComplete message to a wireless channel via the SRB1. After the E-UTRAN receives the RRCConnectionReestablishmentComplete message, the RRC connection re-establishment procedure is completed.

It is noted that actions of steps S310-316 upon the reception of the RRCConnectionReestablishment message are part actions upon the reception of the RRCConnectionReestablishment. The other actions upon t the reception of the RRCConnectionReestablishment, such as timer control, value setting, and so on, are specified in the 3GPP standard.

SUMMARY OF THE INVENTION

An exemplary embodiment of the present invention provides a method of handling radio bearer resumption. First the wireless communication device receives the connection reconfiguration message including the handover message. Second the wireless communication device determines whether the received connection reconfiguration message including the handover message is the first received connection reconfiguration message including the handover message after a successful completion of a connection re-establishment procedure. Third, the wireless communication device resumes at least one of the suspended signaling radio bearer and the suspended data radio bearers when the received connection reconfiguration message including the handover message is the first received connection reconfiguration message including the handover message after the successful completion of the connection re-establishment procedure.

An exemplary embodiment of the present invention provides a method of handling radio bearer resumption. First the wireless communication device receives the connection reconfiguration message including the handover message. Second the wireless communication device determines whether the received connection reconfiguration message including the handover message is the first received connection reconfiguration message including the handover message after a successful completion of a connection re-establishment procedure. Third, the wireless communication device the received connection reconfiguration message including the handover message as an invalid message when the received connection reconfiguration message including the handover message is a first received connection reconfiguration message including the handover message after a successful completion of a connection re-establishment procedure.

An exemplary embodiment of the present invention provides a wireless communication device. The wireless communication device comprises a software-based function module to handle radio bearer resumption. The software-based function module resumes at least one of a suspended signaling radio bearer and suspended data radio bearers when a received connection reconfiguration message including a handover message is a first received connection reconfiguration message including the handover message after a successful completion of a connection re-establishment procedure.

An exemplary embodiment of the present invention provides a wireless communication device. The wireless communication device comprises a software-based function module to handle radio bearer resumption. The software-based function module considers a received connection reconfiguration message including s handover message as an invalid message resuming when the received connection reconfiguration message including the handover message is a first received connection reconfiguration message including the handover message after a successful completion of a connection re-establishment procedure.

An exemplary embodiment of the present invention provides a wireless communication system, and the wireless communication system comprises a wireless communication device and a network backbone. The wireless communication device comprises a software-based function module to handle radio bearer resumption. The software-based function module resumes at least one of a suspended signaling radio bearer and suspended data radio bearers when a received connection reconfiguration message including a handover message is a first received connection reconfiguration message including the handover message after a successful completion of a connection re-establishment procedure.

An exemplary embodiment of the present invention provides a wireless communication system, and the wireless communication system comprises a wireless communication device and a network backbone. The wireless communication device comprises a software-based function module to handle radio bearer resumption. The software-based function module considers a received connection reconfiguration message including s handover message as an invalid message resuming when the received connection reconfiguration message including the handover message is a first received connection reconfiguration message including the handover message after a successful completion of a connection re-establishment procedure.

Accordingly, the methods of handling radio bearer resumption illustrated in the exemplary embodiments of the present invention can prevent the transmission stall and the reception on the suspended SRB2 and the suspended DRBs. Furthermore, wireless communication devices and wireless communication systems using the same can also handle radio bearer resumption.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

Referring to FIG. 4A.

Referring to FIG. 4B.

Referring to FIG. 5A.

Referring to FIG. 5B.

DESCRIPTION OF THE EMBODIMENTS

Figure 1:
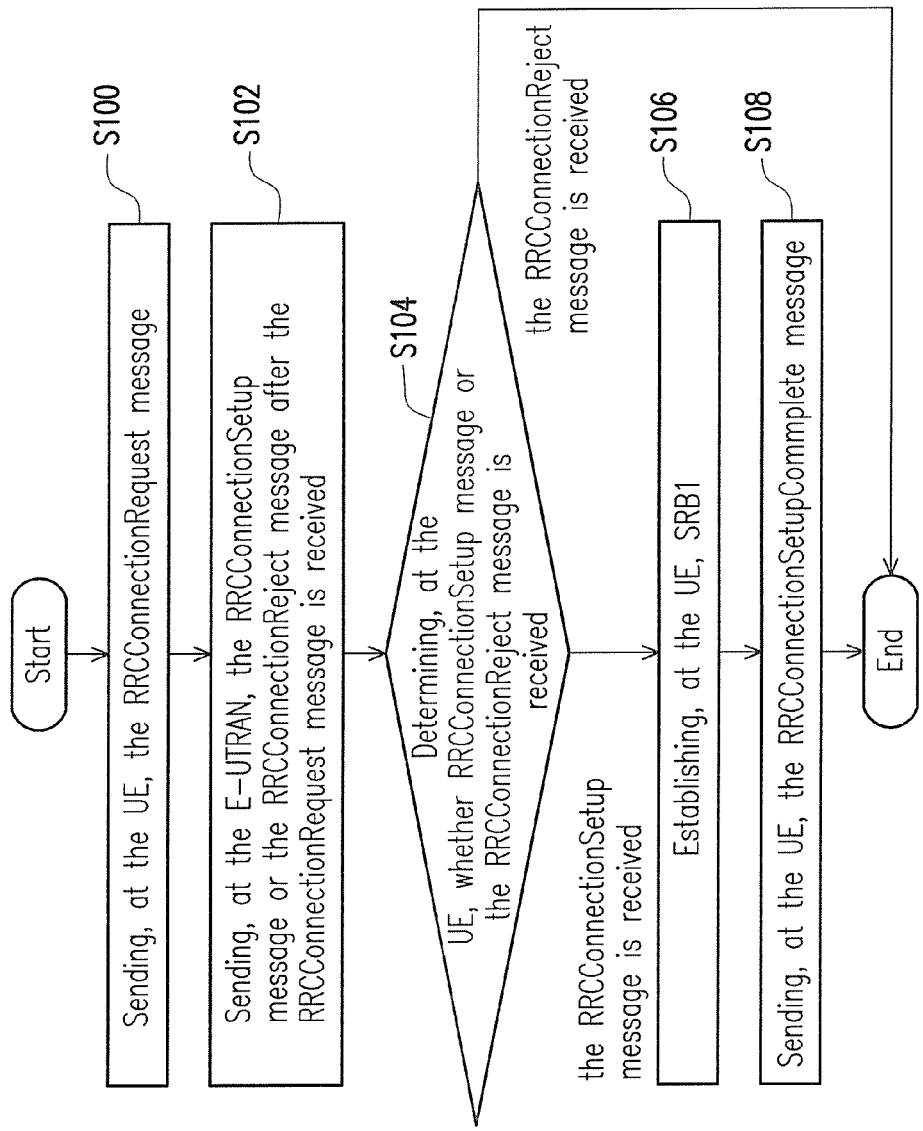
FIG. 1 is a flow chart showing the RRC connection procedure of the wireless communication device and the network backbone.
Figure 2:
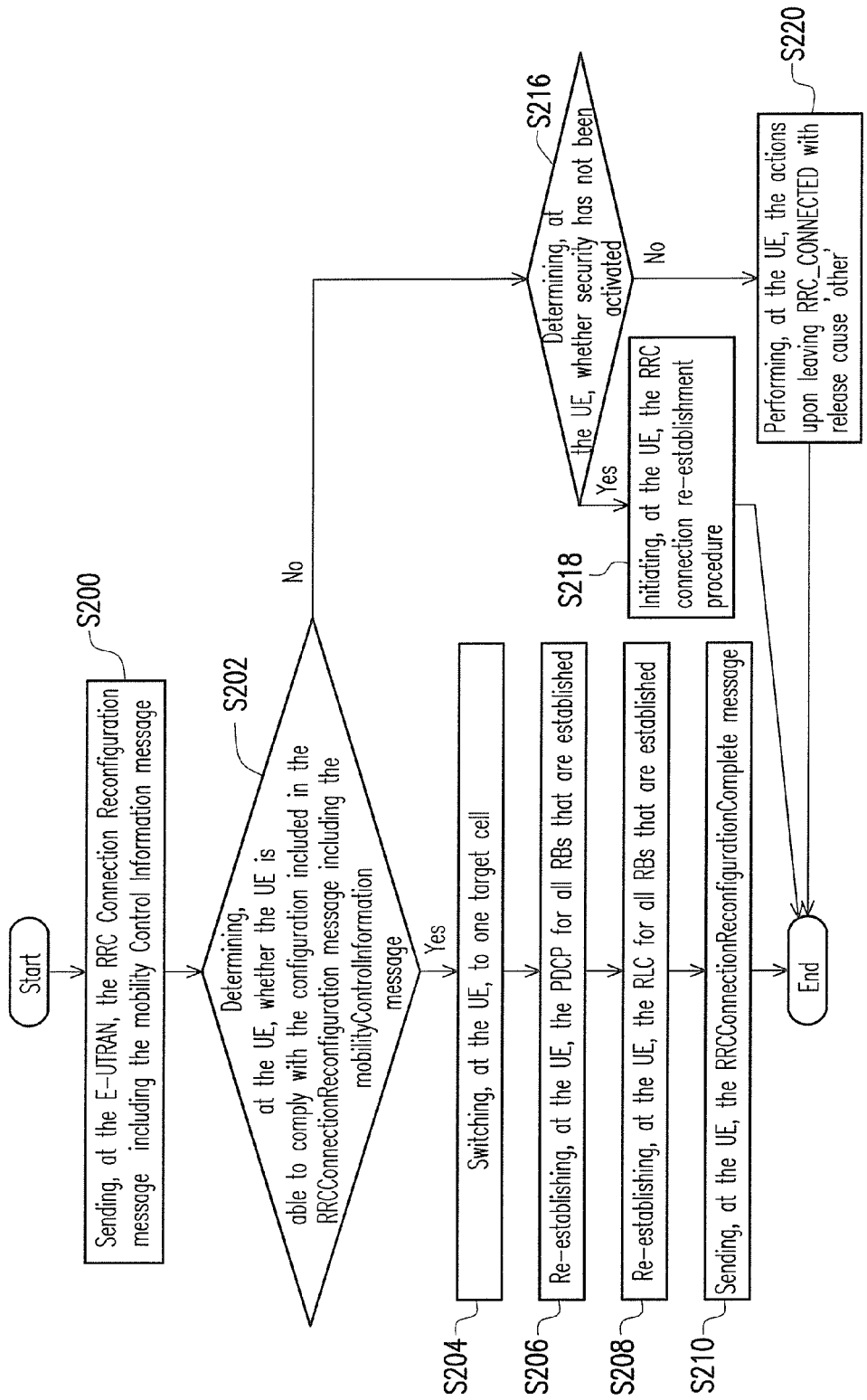
FIG. 2 is a flow chart showing the RRC connection reconfiguration procedure of the wireless communication device and the network backbone when the wireless communication device should handover.
Figure 3:
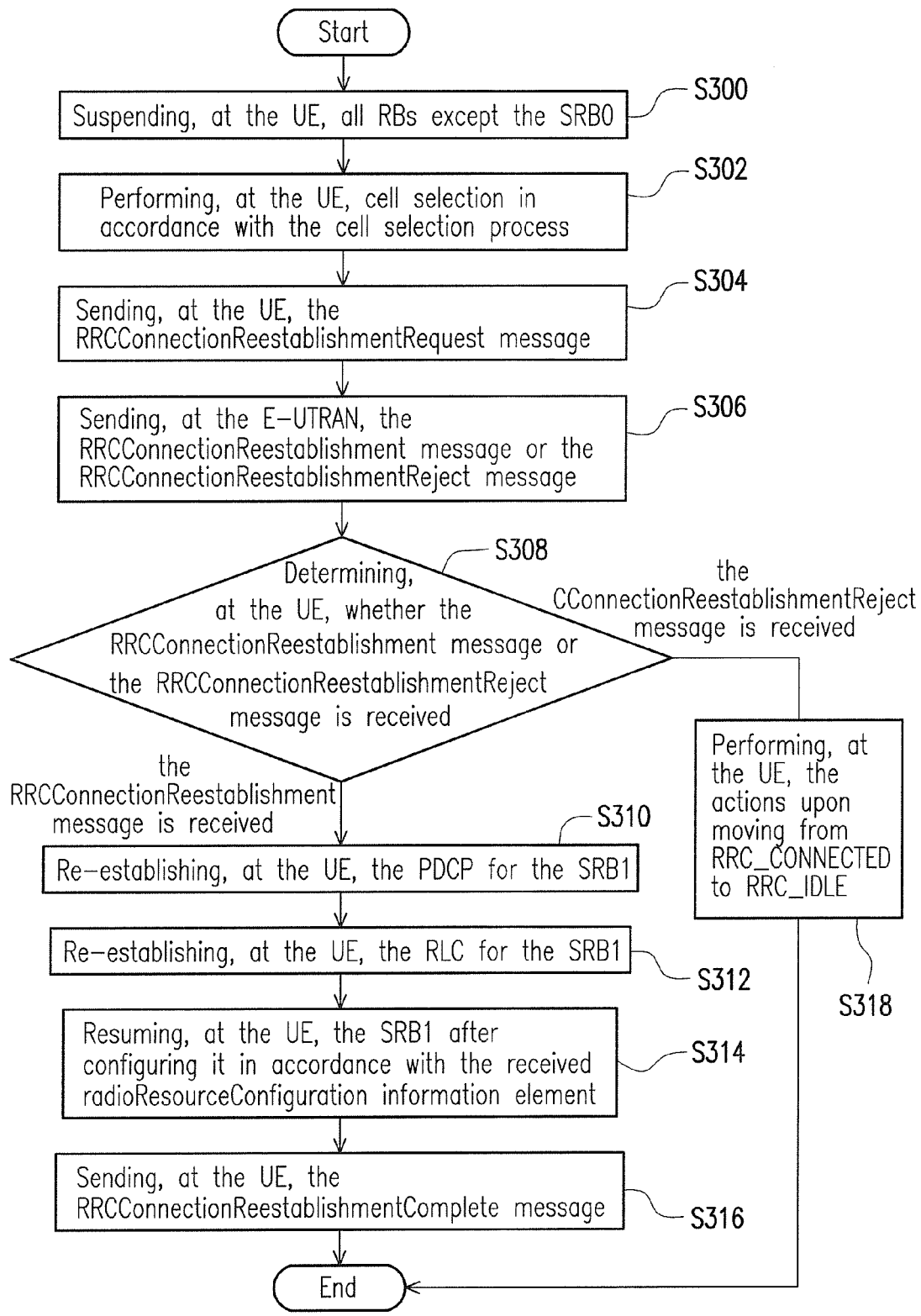
FIG. 3 is a flow chart showing the RRC connection re-establishment procedure of the wireless communication device and the network backbone.

Reference will now be made in detail to the present preferred embodiment of the invention, examples of which are illustrated in the accompanying drawings. Wherever possible, the same reference numbers are used in the drawings and the description to refer to the same or like parts.

When a wireless communication device initiates a RRC connection re-establishment procedure, the wireless communication device suspends all RBs except the SRB0. When the wireless communication device receives the RRCConnectionReestablishment message, the wireless communication device resumes the SRB1. If the wireless communication device receives a handover command (i.e. the RRCConnectionReconfiguration message including the mobilityControlInformation message) following the RRCConnectionReestablishment message, the wireless communication device does not resume the configured SRB2 and the configured DRBs. Accordingly, this will cause transmission and reception on the SRB2 and the DRBs stall. Therefore, the exemplary embodiments of present invention provide methods of handling the radio bearer resumption, wireless communication devices and wireless communication systems using one of the methods.

Figure 4A:
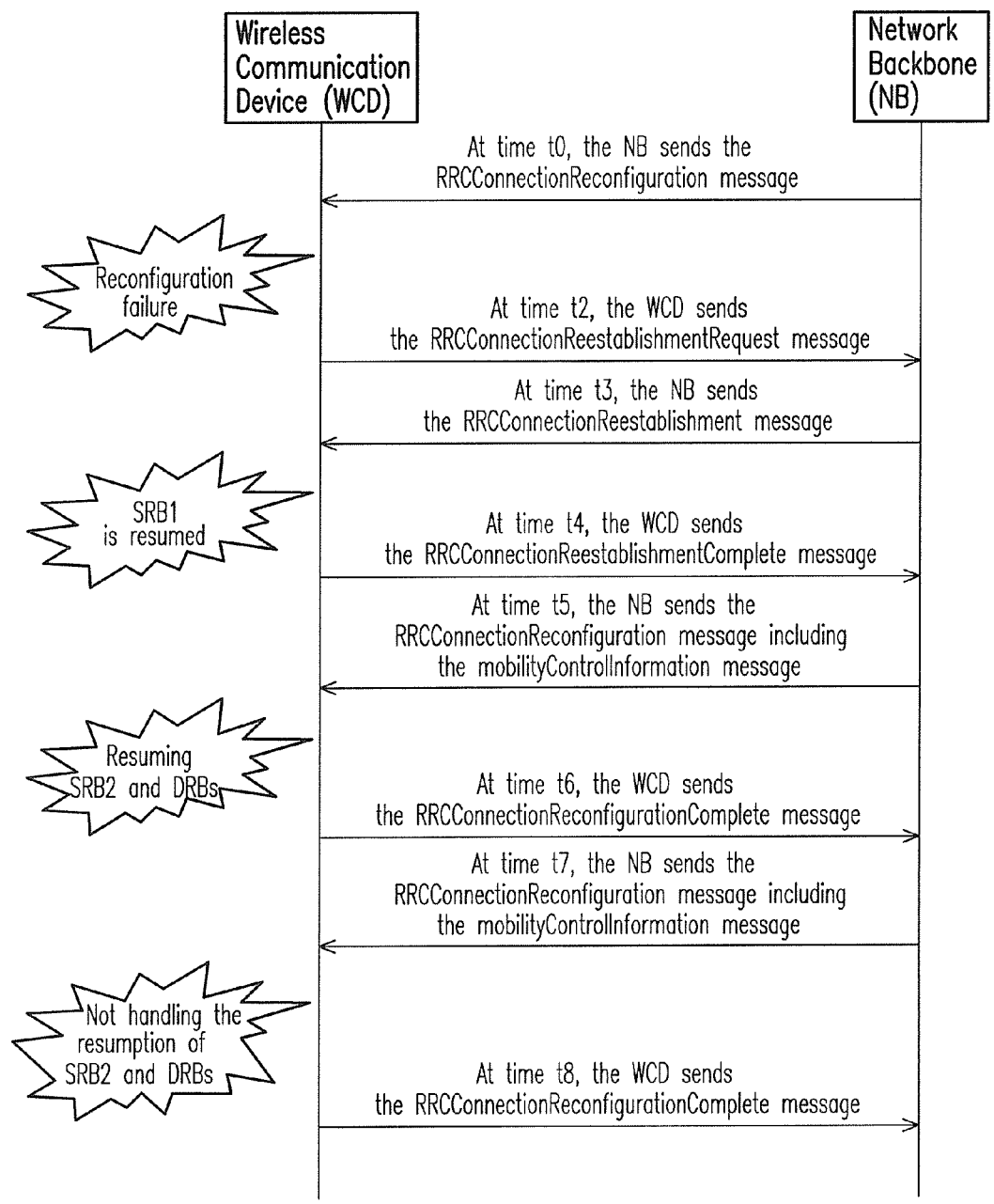
FIG. 4A is a schematic diagram showing the concepts of a method of handling the radio bearer resumption provided by an exemplary embodiment of the present invention.

Referring to FIG. 4A, FIG. 4A is a schematic diagram showing the concepts of a method of handling the radio bearer resumption provided by an exemplary embodiment of the present invention. The wireless communication system comprises at least a wireless communication device and at least a network backbone. The wireless communication device includes a software-based function module to executing the method of handling the radio bearer resumption. The wireless communication system may be the 3GPP system, the wireless communication device may be the UE, and the network backbone may be the E-UTRAN or the UTRAN.

At time t0, the network backbone sends RRCConnectionReconfiguration message to the wireless communication device via a wireless channel. In the exemplary embodiment, after the wireless communication device receives the RRCConnectionReconfiguration message from the wireless channel, it regards the reconfiguration procedure as failure and suspends the configured SRB1, the configured SRB2 and the configured DRBs.

At time t2, the wireless communication device sends the RRCConnectionReestablishmentRequest message to the network backbone via the wireless channel. At time t3, after the network backbone receives the RRCConnectionReestablishmentRequest message from the wireless channel, it sends the RRCConnectionReestablishment message to the wireless communication device via the wireless channel. After the wireless communication device receives the RRCConnectionReestablishment message, the wireless communication device resumes the configured SRB1. Then at time t4, the wireless communication device sends the RRCConnectionReestablishmentComplete message to indicate the network backbone that the RRC connection re-establishment procedure is completed.

At time t5, when the wireless communication device should handover, the network backbone sends the RRCConnectionReconfiguration message including the mobilityControlInformation message to the wireless communication device via the wireless channel. After the wireless communication device receives the RRCConnectionReconfiguration message including the mobilityControlInformation message from the wireless channel, it determines whether the received RRCConnectionReconfiguration message is the first received RRCConnectionReconfiguration message after successful completion of the RRC connection re-establishment. If the received RRCConnectionReconfiguration message is the first received RRCConnectionReconfiguration message including the mobilityControlInformation message after successful completion of the RRC connection re-establishment, the wireless communication device resumes the suspended SRB2 and the suspended DRBs to prevent the transmission stall and the reception stall on the SRB2 and the DRBs; otherwise, the wireless communication device neglects the suspension of the suspended SRB2 and the suspended DRBs.

In the exemplary embodiment, during time t5 and time t6, the received RRCConnectionReconfiguration message is the first received RRCConnectionReconfiguration message including the mobilityControlInformation message after successful completion of the RRC connection re-establishment. Thus, the wireless communication device resumes the suspended SRB2 and the suspended DRBs.

At time t6, the wireless communication device sends the RRCConnectionReconfigurationComplete message to the network backbone via the wireless channel. At time t7, the network backbone sends the RRCConnectionReconfiguration message including the mobilityControlInformation message to the wireless communication device via the wireless channel. After the wireless communication device receives the RRCConnectionReconfiguration message including the mobilityControlInformation message from the wireless channel, it determines the received RRCConnectionReconfiguration message is not the first received RRCConnectionReconfiguration message after successful completion of the RRC connection re-establishment, and therefore the wireless communication device does not handle the resumption of the suspended SRB2 and the suspended DRBs. At time t8, the wireless communication device sends the RRCConnectionReconfigurationComplete message to the network backbone via the wireless channel.

Figure 4B:
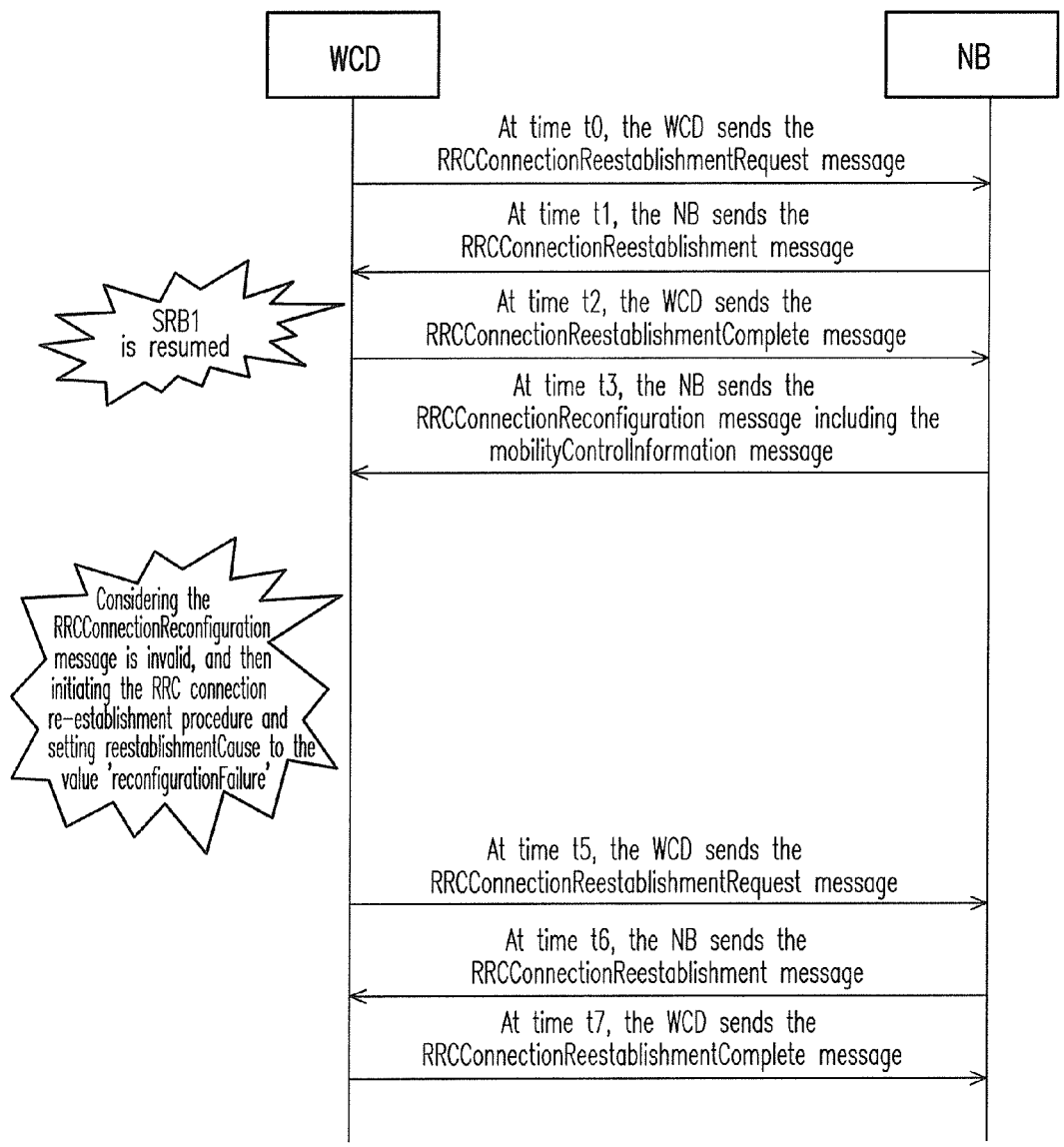
FIG. 4B is a schematic diagram showing the concepts of a method of handling the radio bearer resumption provided by another one exemplary embodiment of the present invention.

Referring to FIG. 4B, FIG. 4B is a schematic diagram showing the concepts of a method of handling the radio bearer resumption provided by another one exemplary embodiment of the present invention. At time t0, the wireless communication device sends the RRCConnectionReestablishmentRequest message to the network backbone via a wireless channel. After the network backbone receives RRCConnectionReestablishmentRequest message from the wireless channel, at time t1, it sends the RRCConnectionReestablishment message to the wireless communication device via the wireless channel. After the wireless communication device receives the RRCConnectionReestablishment message from the wireless channel, at time t2, it sends the RRCConnectionReestablishmentComplete message to the network backbone via the wireless channel. At time t3, the network backbone sends the RRCConnectionReconfiguration message including the mobilityControlInformation message to the wireless communication device via the wireless channel, so as to indicate that the wireless communication device should handover. After the wireless communication device receives the RRCConnectionReconfiguration message including the mobilityControlInformation message from the wireless channel, it determines whether the received RRCConnectionReconfiguration message is the first received RRCConnectionReconfiguration message after successful completion of the RRC connection re-establishment. If the received RRCConnectionReconfiguration message is the first received RRCConnectionReconfiguration message after successful completion of the RRC connection re-establishment, the wireless communication device considers the RRCConnectionReconfiguration message is invalid, then initiates the RRC connection re-establishment procedure and sets reestablishmentCause to the value 'reconfigurationFailure'; otherwise, the wireless communication device considers the RRCConnectionReconfiguration message is valid, and the actions upon RRC connection reconfiguration procedure specified in the 3GPPP standard are executed.

In the exemplary embodiment, during time t3 and time t4, the received RRCConnectionReconfiguration message is the first received RRCConnectionReconfiguration message after successful completion of the RRC connection re-establishment. Thus, the wireless communication device considers the RRCConnectionReconfiguration message is invalid, then initiates the RRC connection re-establishment procedure and sets reestablishmentCause to the value 'reconfigurationFailure'.

At time t5, the wireless communication device sends the RRCConnectionReestablishmentRequest message to the network backbone via the wireless channel. After the network backbone receives the RCConnectionReestablishmentRequest message from the wireless channel, at time t6, the network backbone sends RRCConnectionReestablishment message to the wireless communication device via the wireless channel. Then at time t7, the wireless communication device sends the RRCConnectionReestablishmentComplete message to indicate the network backbone that the RRC connection re-establishment procedure is completed.

Figure 5A:
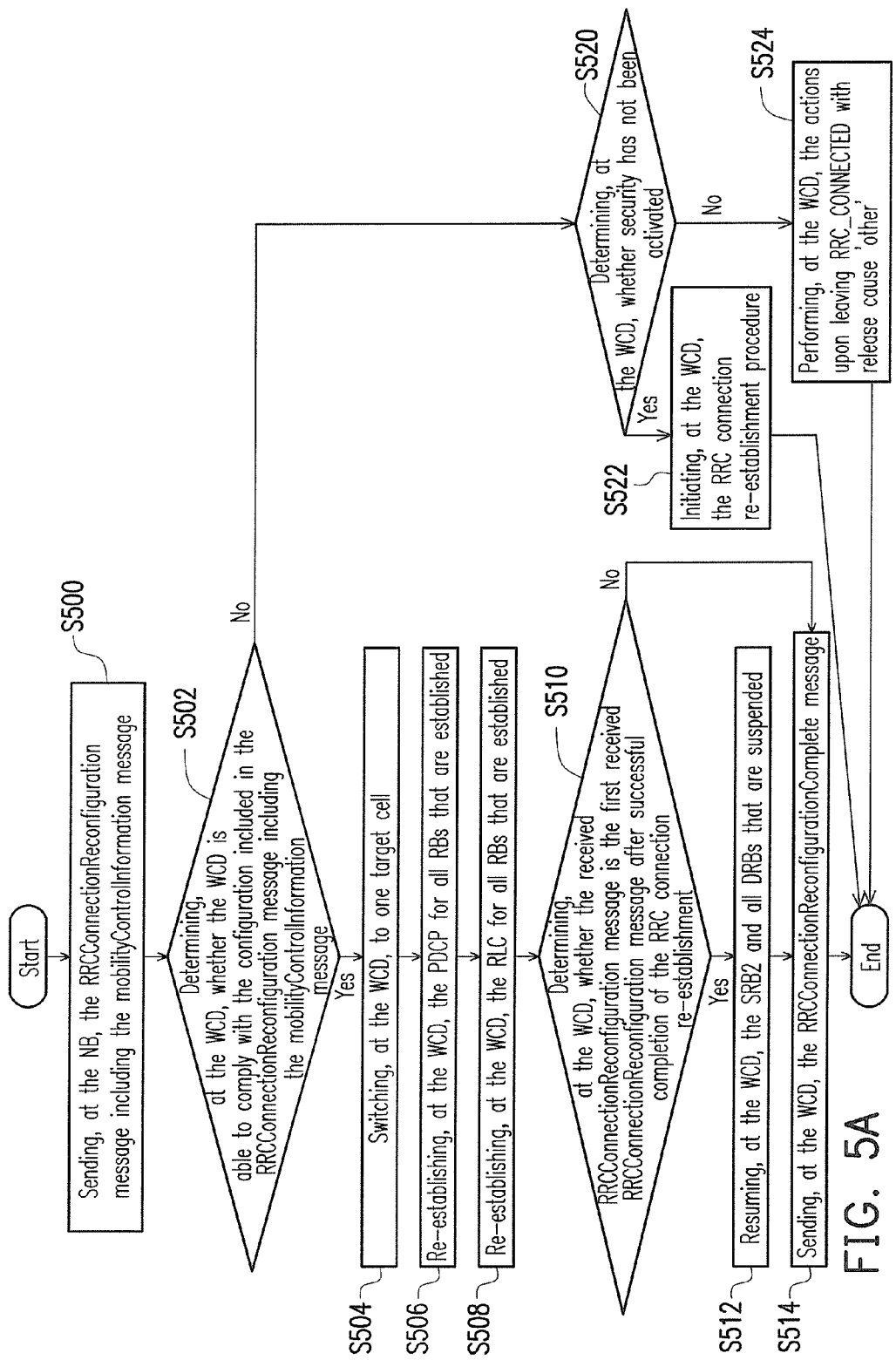
FIG. 5A is a flow chart a method of handling the radio bearer resumption provided by an exemplary embodiment of the present invention.

Referring to FIG. 5A, FIG. 5A is a flow chart a method of handling the radio bearer resumption provided by an exemplary embodiment of the present invention. In this exemplary embodiment example, the wireless communication device may be the UE, and the network backbone may be the UTRAN or the E-UTRAN. In step S500, the network backbone sends the RRCConnectionReconfiguration message including the mobilityControlInformation message to the wireless channel. In step S502, the wireless communication device receives the RRCConnectionReconfiguration message including the mobilityControlInformation message from the wireless channel, and determines whether it is able to comply with the configuration included in the RRCConnectionReconfiguration message including the mobilityControlInformation message. If some parameter in the RRCConnectionReconfiguration message including the mobilityControlInformation message is invalid for the wireless communication device, the wireless communication device can not comply with the configuration included in the RRCConnectionReconfiguration message including the mobilityControlInformation message, and then step S520 is executed; otherwise, the wireless communication device can comply with the configuration included in the RRCConnectionReconfiguration message including the mobilityControlInformation message, and step S504 is executed.

In step S504, the wireless communication device switches to one target cell to achieve handover. If the eutra-CarrierFreq parameter is included in the mobilityControlInformation message, the wireless communication device considers the target cell to be one on the frequency indicated by the eutra-CarrierFreq with a physical cell identity indicated by the targetCellIdentity included in the mobilityControlInformation message; otherwise, the wireless communication device considers the target cell to be one on the current frequency with a physical cell identity indicated by the targetCellIdentity parameter included in the mobilityControlInformation message. In step S506, the wireless communication device re-establishes the PDCP for all RBs that are established. In step S508, the wireless communication device re-establishes the RLC for all RBs that are established.

It is noted that actions of steps S502-S508 upon the reception of the RRCConnectionReconfiguration message including the mobilityControlInformation message are part actions upon the reception of the RRCConnectionReconfiguration message including the mobilityControlInformation message. The other actions upon the reception of the RRCConnectionReconfiguration message including the mobilityControlInformation message, such as timer control, value setting, and so on, are specified in the 3GPP standard.

Then in step S510, the wireless communication device determines whether the received RRCConnectionReconfiguration message is the first received RRCConnectionReconfiguration message after successful completion of the RRC connection re-establishment. If the received RRCConnectionReconfiguration message including the mobilityControlInformation message is the first received RRCConnectionReconfiguration message including the mobilityControlInformation message after successful completion of the RRC connection re-establishment, step S512 is executed; otherwise, step S514 is executed. In step S512, the wireless communication device resumes the suspended SRB2 and the suspended DRBs, so as to prevent the transmission stall and the reception on the suspended SRB2 and the suspended DRBs. Next, in step S514, the wireless communication device sends the RRCConnectionReconfigurationComplete message to the wireless channel. Then the network backbone receives the RRCConnectionReconfigurationComplete message from the wireless channel, and the RRC connection reconfiguration procedure is completed.

The wireless communication device regards the reconfiguration procedure as failure, when the wireless communication device can not comply with the configuration included in the RRCConnectionReconfiguration message including the mobilityControlInformation message. The wireless communication device uses the configuration used prior to the reception of the RRCConnectionReconfiguration message. Then in step S520, the wireless communication device determines whether security has not been activated. If the security has not been activated, the wireless communication device performs the actions upon leaving RRC_CONNECTED with release cause 'other' in step S524; otherwise, the wireless communication device initiates the RRC connection re-establishment procedure in step S522. The details of step S524 and the security are specified in the 3GPP standard, and are not described herein again.

Figure 5B:
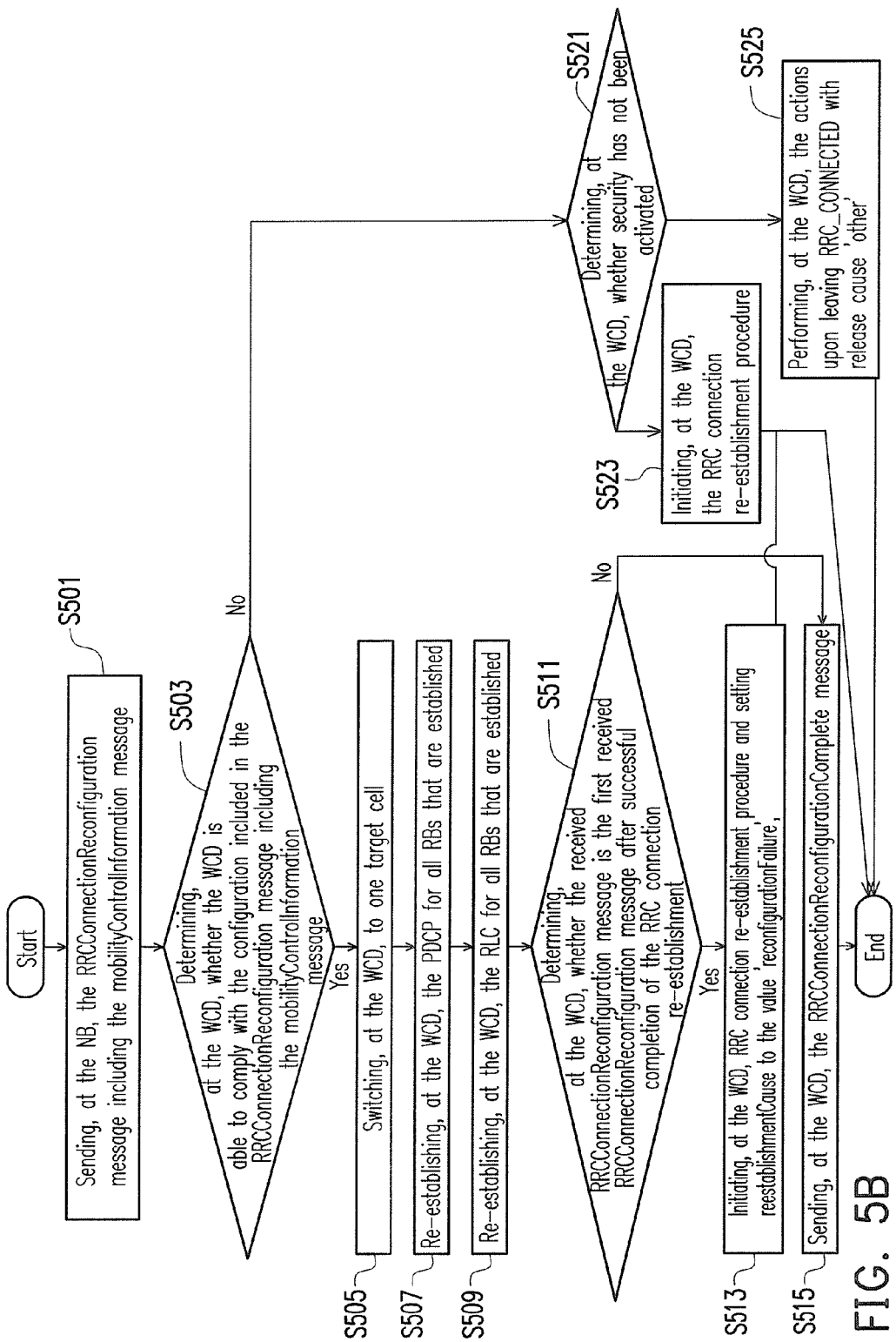
FIG. 5B is a flow chart showing a method of handling the radio bearer resumption provided by an exemplary embodiment of the present invention.

Referring to FIG. 5B, FIG. 5B is a flow chart showing a method of handling the radio bearer resumption provided by an exemplary embodiment of the present invention. In this exemplary embodiment example, the wireless communication device may be the UE, and the network backbone may be the UTRAN or the E-UTRAN. Steps S501-S511, and S521-S525 are same as steps S500-510, and S520-524. Herein steps S501-S511, and S521-S525 would not be described again.

If the received RRCConnectionReconfiguration message including the mobilityControlInformation message is the first received RRCConnectionReconfiguration message including the mobilityControlInformation message after successful completion of the RRC connection re-establishment, step S513 is executed; otherwise, step S515 is executed. In step S513, the wireless communication device considers the received RRCConnectionReconfiguration message including the mobilityControlInformation is invalid, then it initiates the RRC connection re-establishment procedure, sets reestablishmentCause to the value 'reconfigurationFailure'.

Accordingly, the methods of handling radio bearer resumption illustrated in the exemplary embodiment of the present invention can prevent the transmission stall and the reception on the suspended SRB2 and the suspended DRBs. Furthermore, wireless communication devices and wireless communication systems using the same can also handle radio bearer resumption.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A method of handling radio bearer resumption, comprising:
   receiving, at a wireless communication device, a connection reconfiguration message including a handover message;
   determining, at the wireless communication device, whether the received connection reconfiguration message including the handover message is a first received connection reconfiguration message including the handover message after a successful completion of a connection re-establishment procedure; and
   resuming, at the wireless communication device, at least one of a suspended signaling radio bearer and suspended data radio bearers when the received connection reconfiguration message including the handover message is the first received connection reconfiguration message including the handover message after the successful completion of the connection re-establishment procedure.

2. The method of handling radio bearer resumption according to claim 1, wherein the connection reconfiguration message is a RRCConnectionReconfiguration message, the handover message is a mobilityControlInformation message, and the connection re-establishment procedure is a radio resource control (RRC) connection re-establishment procedure.

3. The method of handling radio bearer resumption according to claim 1, the suspended signaling radio bearer is a SRB2, and the suspended SRB2 is resumed.

4. The method of handling radio bearer resumption according to claim 1, further comprising:
maintaining, at the wireless communication device, the suspended signaling radio bearer and suspended data radio bearers suspended when the received connection reconfiguration message including the handover message is not the first received connection reconfiguration message including the handover message after the successful completion of the connection re-establishment procedure.

5. A method of handling radio bearer resumption, comprising:
receiving, at a wireless communication device, a connection reconfiguration message including a handover message;
determining, at the wireless communication device, whether the received connection reconfiguration message including the handover message is a first received connection reconfiguration message including the handover message after a successful completion of a connection re-establishment procedure; and
considering, at the wireless communication device, the received connection reconfiguration message including the handover message as an invalid message, when the received connection reconfiguration message including the handover message is a first received connection reconfiguration message including the handover message after a successful completion of a connection re-establishment procedure.

6. The method of handling radio bearer resumption according to claim 5, wherein the connection reconfiguration message is a RRCConnectionReconfiguration message, the handover message is a mobilityControlInformation message, and the connection re-establishment procedure is a RRC connection re-establishment procedure.

7. The method of handling radio bearer resumption according to claim 5, wherein when the received connection reconfiguration message including the handover message is considered as the invalid message, the method of handling radio bearer resumption further comprising:
initiating, at the wireless communication device, the connection re-establishment procedure; and
setting, at the wireless communication, a re-establishment cause to a reconfiguration failure value.

8. The method of handling radio bearer resumption according to claim 5, further comprising:
sending, at the wireless communication device, a connection reconfiguration complete message, when the received connection reconfiguration message including the handover message is not a first received connection reconfiguration message including the handover message after a successful completion of a connection re-establishment procedure.

* * * * *